United States Patent [19]

Phillips

[11] 4,145,201
[45] Mar. 20, 1979

[54] GLASS FIBER PRODUCING AND COLLECTING APPARATUS

[75] Inventor: John D. Phillips, Newark, Ohio

[73] Assignee: Owens-Corning Fiberglas Corporation, Toledo, Ohio

[21] Appl. No.: 884,100

[22] Filed: Mar. 6, 1978

[51] Int. Cl.² .............................................. C03G 37/02
[52] U.S. Cl. ........................................ 65/2; 65/11 W;
65/29; 65/158; 242/18 G
[58] Field of Search ................. 65/2, 11 W; 242/18 G

[56] References Cited

U.S. PATENT DOCUMENTS

| 3,265,476 | 8/1966 | Roberson | 65/11 W X |
| 3,269,816 | 8/1966 | Helbing | 65/2 |
| 3,539,317 | 10/1970 | Smith | 65/11 W |
| 3,587,298 | 6/1971 | Trethewey | 65/11 W |
| 3,820,967 | 6/1974 | Johnson | 65/2 |

Primary Examiner—Robert L. Lindsay, Jr.

Attorney, Agent, or Firm—Ronald C. Hudgens; Joel I. Rosenblatt; Charles F. Schroeder

[57] ABSTRACT

This is an improvement to current processes and apparatus for producing monofilament glass fibers from a single or a multitude of streams of molten or plastic glass, being drawn through an orifice feeder into fibers and collected on a winder. A speed control is provided to the winder motor, to alter the speed of the motor in response to a change in temperature of the orifice, or to an interruption in the drawing process. The result is that at start-up after an interruption or with a drop in temperature at the orifice, the monofilament strands are of constant diameter. A predetermined time after start-up or when the temperature of the orifice changes, the speed control changes the rate of drawing the monofilaments and the diameter of the monofilaments are maintained consistent subsequent to an interruption to the process or when the temperature of the orifice changes.

11 Claims, 1 Drawing Figure

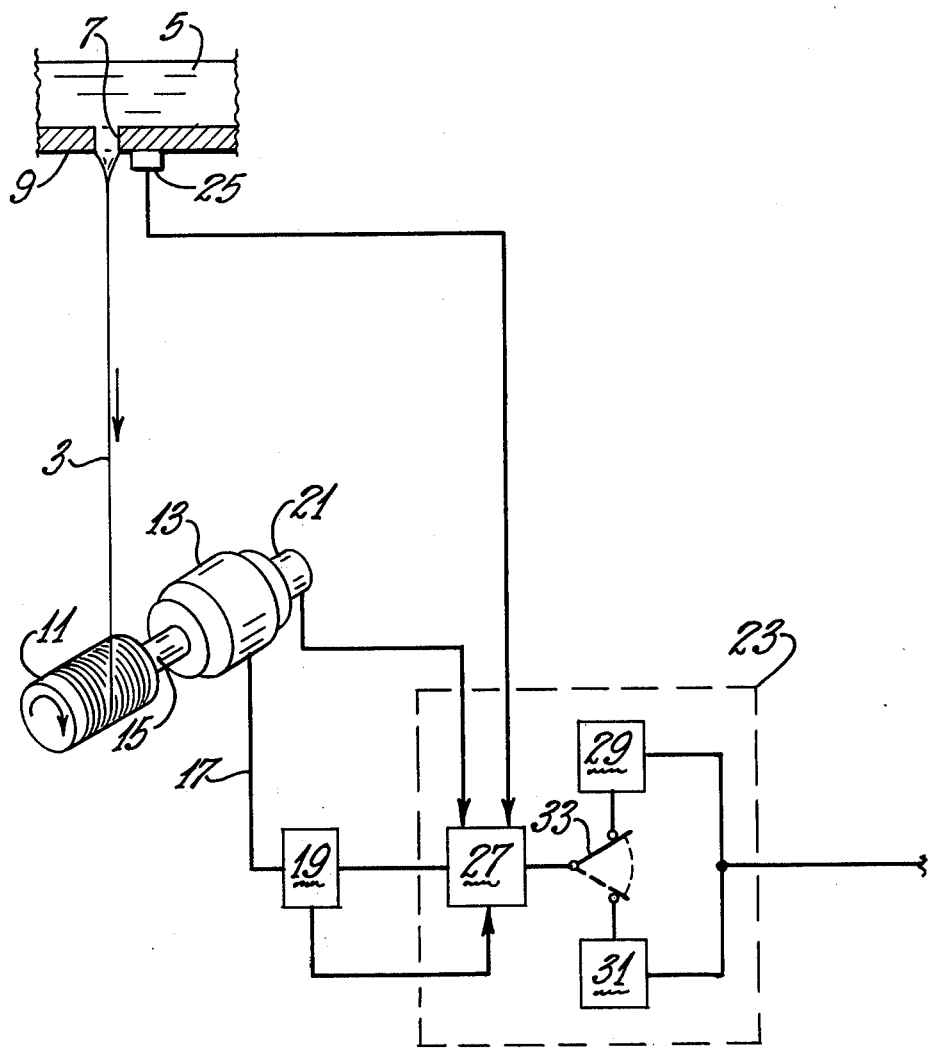

GLASS FIBER PRODUCING AND COLLECTING APPARATUS

BACKGROUND OF THE INVENTION

This invention relates to glass fiber production. One method for manufacturing textiles and glass involves attenuating a plurality of one or more of a plurality of streams of molten glass into fibers, collecting the fibers into a strand and winding the strand into a package for subsequent use in manufacturing various products. The molten or plastic glass initially flows at a controlled rate from the furnace forehearth into a feeder or bushing which has a plurality of orifices formed in its bottom. As the molten glass flows from the orifices it is pulled downwardly at a high rate of speed for attenuation into fibers. A plurality of attenuated fibers are gathered together into a strand, coated with sizing and the strand is wound onto a winder.

It has not been uncommon in drawing a monofilament strand in molten plastic glass through a bushing, for a break in the fiber to interrupt the process, causing a change in temperature of the orifice or a change in temperature of the plastic molten glass. Subsequent to this break or interruption, pulling the filament at the same pulling rate would cause a change in the diameter filament, dependent on temperature change during the interruption, altering the quality of the filament, or where there is a plurality of filaments produced by a plurality of bushings, of the strand. Various controls have been used in the prior art to maintain the pulling rate constant as the diameter of the strands wound on the winder collet increases so that the pulling rate is held constant as the winder collet diameter increases, as shown in U.S. Pat. No. 3,265,476. However, the prior art does not show a speed control to control the rate of pulling in response to interruption, or a change in temperature at the shaper, where continued pulling at the same said constant pulling rate subsequent to said change in interruption and said change in temperature, would produce inferior fibers of a non-uniform diameter.

SUMMARY OF THE INVENTION

According to the present invention, a winder collet is used to pull a monofilament or a plurality of monofilaments from a plastic source of glass such as molten glass. The winding collet is driven by a motor connected to a source of power through a speed control means. The speed may be changed from a lower to a higher speed to increase the pulling rate or conversely from the higher speed in to the low speed to decrease the pulling rate at startup or in response to a change in temperature of the shaper or an interruption of a winder. The temperature at the bushing may be sensed by a temperature sensor, having an output connected to the motor speed control. In addition, interruptions to the pulling of the filament, may be sensed by a sensor connected to the winder. Other sensors for sensing an interruption in the winder may be connected to the power line to sense an interruption in winder power, or mounted on the winder motor switch to sense an opening of the switch, or may be a motion sensing device connected to the winder motor or the winder collet. As is well known in the art, many different sensors can be used to sense changes in temperature or an interruption in winder operation.

Accordingly, it is an object of this invention to produce uniform filaments from a source of plastic materials such as molten glass by starting the molten glass through a bushing, and engaging the filament with the means for pulling glass filaments at a first rate and then altering the pulling rate at which the fiber is pulled from the source of plastic material a predetermined time after said fiber pulling is initiated.

Additionally, it is an object of this invention to provide for changing the pulling rate subsequent to interruption when pulling has been reinitiated to maintain the filaments of a continuous diameter, and at a predetermined time after said pulling is reinitiated, to change the pulling rate to a new rate of speed.

Further, this invention provides for changing the pulling rate when the temperature of the bushing changes, to maintain the filaments in a uniform diameter.

The fiber-forming and collecting process may be viewed in U.S. Pat. Nos. 3,265,476 and 3,227,729. U.S. Pat. No. 3,265,476 shows winding speed monitoring and control. U.S. Pat. No. 3,227,729 shows heaters in the bushing to maintain constant bushing temperature. A copending application, Ser. No. 866,104, filed Dec. 30, 1977 by John T. Beckman and John W. Lonberger, discloses a digital computer for programmed control for a slow starting speed after interruption, and which is referred to in that application as a cold start.

BRIEF DESCRIPTION OF THE DRAWING

The attached drawing shows a source of plastic materials such as glass, being drawn into a filament through a bushing and being wound on a winder collet. The winder collet is shown driven by a motor, which is controlled by a speed control means.

DESCRIPTION OF THE PREFERRED EMBODIMENTS

Turning now to the drawing, a preferred embodiment for practicing this invention is shown as being exemplary of the principles of this invention but is by no means meant to limit this invention to the embodiment shown.

In the drawing, a means is shown generally as numeral 1 for drawing the filament 3 from the source of thermoplastic material such as molten glass shown as 5, through a means being, an orifice 7 in bushing 9. The supply of molten glass 5 is shown in partial form.

The filament is engaged with the winder collet 11 by being wrapped around the collet after being initially drawn through said orifice 7. The collet 11 is then rotated by motor collet driver 13 through a suitable drive connection shown as 15. The power to motor 13 is supplied by power line 17. A current sensor 19 is attached to power line 17. A second sensor 21 is shown attached to motor 13 and senses rotary motion of motor 13 and more particularly cessation of that rotary motion. The sensor 21 may also be attached to collet 11 as is known in the art or to the drive connection 15 betwen motor 13 and the collet 11. A means for pulling said filament at a first rate and for altering said rate subsequent to a predetermined time is shown generally as numeral 23 with said first sensor 19 connected to the power line and sensing an interruption in said power to said motor, and with said second sensor 21 connected to said motor 13 and sensing a cessation of motion in the motor. Sensor 21 may also be provided to the drive connection 15 or to collet 11 for the same purpose.

Further shown is a temperature sensor 25 also within said means for altering the pulling rate. As is shown, temperature sensor 25, rotary motion sensor 21, and power sensor 19 are all connected to timer and switching mechanism 27 which provides power from either motor speed control 29 or motor speed control 31, through switch arm 33.

Power is shown applied either through a first speed control 29 for pulling the fiber at first rate, or to a second speed control 31 for pulling the fiber at the second pulling rate. The timer and switching mechanism 27 may select either the first speed control 29, causing the motor to run at the lower speed, or the second speed control 31 causing the motor to run at the higher speed. In addition, a timer 27 may cause the switch 33 to be delayed in switching from one speed control to the other in response to a signal from sensor 19, 21, or 25.

The operation of the device is now described by referring to the drawing. At the initiation of the filament-producing process, the material is drawn through the orifice 7 and attached to the pulling means shown as the winder collet 11. To compensate for the difference in conditions at the orifice 7 at initiation from that occurring after the steady state in the filament processes is reached, the pulling rate must be altered. These steady state conditions, for example, could be a higher orifice temperature. If the orifice 7 temperature at the initiation of the fiber-drawing process is cooler, a small diameter filament, and with more yards per pound of drawn filament, would be produced if the initial pulling rate was the steady state pulling rate for the higher steady state orifice temperature.

Accordingly when an interruption occurs, either by the cessation of power through line 17 or by any other cause, timing and switching mechanism 27 causes 33 to switch to the speed control 29 producing the slower rotation of the collet 11. Subsequent to reapplication of power through switch 35, and reinitiation of the process, power is applied through motor speed control 29 to switch means, power cable 17 to 13 and the collet is operated at the first slower rate.

Additionally, the sensor 19 may also be connected to a main power switch 35 to provide a signal to the switching means whenever the contacts at switch 35 are open indicating power disconnected from the motor, and causing the cessation of the winder process.

A predetermined time subsequent to initiation to filament drawing process, necessary for the orifice 7 to reach the steady state condition, the switching and timer mechanism 27 causes switch 33 to switch to motor speed control 31 altering the pulling rate and providing power to the motor 13 commensurate with a second increased pulling rate, and producing a greater production of filaments but with the consistent uniform diameter.

In the operation of the device, if there is any cessation of the winding process, by blockage or by removal of power deliberately or through a malfunction, switch on 33 will again be moved from speed control 31 to speed control 29 and the means for altering the speed 23 will be ready to reinitiate the process at the lower speed change from the overall system steady state conditions.

Further, any change to the steady state conditions at the orifice 7 will be sensed by temperature sensor 25 and relayed to switching means 23. Accordingly, a decrease in temperature will cause the switching and time mechanism 27 to switch the motor from the first speed control 31 to the speed 29 decreasing the pulling rate accordingly.

The switch and time mechanism as well as the motor speed control units 29 and 31 can be constructed from known units and are elaborated here.

In the case of altering the drawing rate responsive to a change in the temperature it would ordinarily not be necessary to use the timing mechanism as in the case of altering the pulling rate subsequent to a reinitiation of the filament pulling process.

The sensor 19 may be a relay which opens and responds to a cessation of power 17 and provides a low signal to switching and timing mechanism 27, which in turn may use relays to switch on 33. Additionally, a removal of power by that opening of switch 35 may also produce either a high signal, being the voltage across the open switch, to sensor 19 which may cause a subsequent opening of a relay contact, and low signal to switch the timer 27 causing movement of the switch 33 from speed control 31 to speed control 19. The timing mechanism may be any suitable timing mechanism, which responds to a high signal, after initiation of power as relayed to speed control 27 by sensor 19 to move switch on 33 from speed control 29 to speed control 31 subsequent to reinitiation of the winding process. Additionally, cessation of rotary motion may be sensed by sensor 21 causing a similary low signal and sensor 27 which produces a signal which moves the switch on accordingly.

Suitable and well-known temperature sensors may also be used to control the switching mechanism as similarly described in regard to the responsive switching mechanism 27 to the signals of sensors 19 and 21.

As is well known, solid state devices may be used in place of relays. The change in speed described above may be an increase or a decrease dependent upon the expected conditions at initial start-up, initiation after an interruption, and the expected changed conditions during the speed change and non-operating time.

Additionally, a proper subsequent change in pulling rate responsive to temperature changes may be an increase or decrease, dependent upon the extent and direction from steady state conditions. For example, a cooling of the material after a short interruption may call for a slower pulling rate at reinitiation and then a faster pulling rate when steady state conditions are reached. However, should the interruption result in the material cooling too far, it may be necessary to use a higher than steady state pulling rate, to maintain the fibers at a uniform diameter. A similar situation can exist at start-up where the start-up conditions may deviate from the steady state conditions to the extent that a higher or lower initial pulling rate may be required, followed by either a respective lower or higher pulling rate.

I claim:

1. A method for producing uniform continuous fibers from a supply of thermoplastic material comprising the steps of feeding a supply of the material through a plurality of orifices to form streams, attenuating said streams to form a plurality of fibers, said step of attenuating including the step of pulling said fibers from said orifices at a first pulling rate, sensing an interruption in said pulling and responsive to said interruption altering the pulling rate for said fibers to a second pulling rate, restarting said step of attenuating said streams to form said fibers and then altering the pulling rate from said second pulling rate to said first pulling rate subsequent to said restart, and wherein said first and second pulling rates are different pulling rates.

2. The method of claim 1 wherein said step of altering said first pulling rate to said second pulling rate includes the step of decreasing the pulling rate, and said step of altering the pulling rate from said second pulling rate to said first pulling rate includes the step of increasing the pulling rate, and wherein said first and second pulling rates are substantially constant pulling rates.

3. The method of claim 2 wherein said step of altering the pulling rate to said first rate includes the step of altering said pulling rate from said first pulling rate to said second pulling rate a predetermined amount of time after restart.

4. The method of claim 3 wherein said step of attenuating said streams to form a plurality of fibers includes the steps of engaging said fibers with a means for winding said fibers at said first and second pulling rates and for attenuating said streams to form a plurality of fibers and said step of sensing senses an interruption in said pulling of said fibers by said means for winding.

5. The method of claim 3 wherein said step of altering the pulling rate to said first pulling rate a predetermined time after said step of restarting includes the step of sensing the time duration from the moment of restarting subsequent to an interruption.

6. Apparatus for producing uniform continuous fibers from a supply of thermoplastic material comprising a feeder adapted to contain a supply of said material and having a plurality of orifices formed therein for issuing a like plurality of streams of the molten material, and means for attenuating the streams into fibers and for collecting said fibers into a wound package including a collet means for supporting the package, electric motor means for rotating said collet and the support package, means for controlling the speed of said motor means to drive said collet, said means for controlling the speed of said motor controlling said motor at a first speed corresponding to a first pulling rate for attenuating the streams into fibers and for controlling the motor, at a different second speed corresponding to a second pulling rate for attenuating the strand into fibers, means for sensing collet rotation and an interruption to said collet rotation, said means for controlling said motor speed including means for switching said motor selectively between said first and second speeds, said means for sensing collet rotation and an interruption to said collet rotation being connected to said means for switching, for the said motor from said first speed to said second speed, in response to an interruption, for rotating said collet at said second speed subsequent to said interruption.

7. The apparatus of claim 6 wherein said first and second speeds correspond to substantially constant pulling rates and said second speed corresponds to a slower constant pulling rate relative to said first speed.

8. The apparatus of claim 7 including means for timing, said means for controlling the speed of the motor being connected to said means for timing, said means for timing being connected to said means for sensing collet rotation and providing a signal indicative of the time duration from the restart of said collet, and said means for controlling the speed of the motor, responsive to said time signal, altering the speed of the motor from said second speed to said first speed a predetermined time subsequent to said restart.

9. The apparatus of claim 8 wherein said predetermined time corresponds to the time for the said orifices to reach their steady state operating temperature.

10. A method for producing uniform continuous fibers from a supply of thermoplastic material comprising the steps of feeding a supply of the material through a plurality of orifices to form streams, attenuating said streams to form a plurality of fibers, said step of attenuating including the step of pulling said fibers from said orifices at a first pulling rate, sensing an interruption in said pulling and responsive to said interruption, altering the pulling rate for said fibers to a second pulling rate responsive to said interruption, restarting said step of attenuating said streams to form said fibers and then altering the pulling rate from said second pulling rate to said first pulling rate subsequent to said restart, wherein said first and second pulling rates are different pulling rates, and wherein said step of altering said first pulling rate to said second pulling rate includes the step of decreasing the pulling rate, and said step of altering the pulling rate from said second pulling rate to said first pulling rate includes the step of increasing the pulling rate, and wherein said first second pulling rates are substantially constant pulling rates.

11. Apparatus for producing uniform continuous fibers from a supply of thermoplastic material comprising a feeder adapted to contain a supply of said material and having a plurality of orifices formed therein for issuing a like plurality of streams of the molten material, and means for attenuating the streams into fibers and for collecting said fibers into a wound package including a collet means for supporting the package, electric motor means for rotating said collet and the support package, means for controlling the speed of said motor means to drive said collet, said means for controlling the speed of said motor controlling said motor at a first speed corresponding to a first pulling rate for attenuating the streams into fibers and for controlling the motor and a second speed corresponding to a second pulling rate for attenuating the strand into fibers, means for sensing collet rotation and an interruption to said collet rotation, said means for controlling said motor speed including means for switching said motor selectively between said first and second speeds, said means for sensing collet rotation and an interruption to said collet rotation being connected to said means for switching, and said means for switching, switching the said motor from said first speed to said second speed in response to an interruption, for rotating said collet at said second speed subsequent to said interruption, and wherein said first and second speeds correspond to substantially constant pulling rates and said second speed corresponds to a slower constant pulling rate relative to said first speed.

* * * * *

UNITED STATES PATENT AND TRADEMARK OFFICE
CERTIFICATE OF CORRECTION

PATENT NO. : 4,145,201
DATED : March 20, 1979
INVENTOR(S) : John D. Phillips

It is certified that error appears in the above-identified patent and that said Letters Patent are hereby corrected as shown below:

```
Column 3, line 39, delete "through switch 35,".
          line 41, after "switch means" insert -- 33 --. same
          line 41, after "cable 17 to" insert -- motor --.
          line 44, delete "35"
          line 45, delete "at switch 35".
Column 4, line 14, delete "on" and "that".'
          line 15, after "opening of" insert -- a --; and delete
                   "35".
          line 20, change "19" to -- 29 --.
          line 24, delete "on".
          line 27, change "and" to -- to --.
          line 28, delete "on".
Column 5, line 12, "first" to read -- second --.
          line 13, "second" to read -- first --.
```

Signed and Sealed this

Twenty-sixth Day of June 1979

[SEAL]

Attest:

RUTH C. MASON
Attesting Officer

DONALD W. BANNER
Commissioner of Patents and Trademarks